US012428345B2

(12) United States Patent
Cui

(10) Patent No.: US 12,428,345 B2
(45) Date of Patent: Sep. 30, 2025

(54) FIRE RETARDANT CONSTRUCTION MATERIALS

(71) Applicant: Futong Cui, Matthews, NC (US)

(72) Inventor: Futong Cui, Matthews, NC (US)

(73) Assignee: North American MGO, LLC., North Aurora, IL (US)

( * ) Notice: Subject to any disclaimer, the term of this patent is extended or adjusted under 35 U.S.C. 154(b) by 723 days.

(21) Appl. No.: 16/548,450

(22) Filed: Aug. 22, 2019

(65) Prior Publication Data
US 2019/0375685 A1  Dec. 12, 2019

Related U.S. Application Data

(62) Division of application No. 15/089,824, filed on Apr. 4, 2016, now Pat. No. 10,392,308.

(51) Int. Cl.
C04B 28/00 (2006.01)
B32B 3/26 (2006.01)
(Continued)

(52) U.S. Cl.
CPC .............. *C04B 28/32* (2013.01); *B32B 3/266* (2013.01); *B32B 5/022* (2013.01); *B32B 5/024* (2013.01); *B32B 5/18* (2013.01); *B32B 13/02* (2013.01); *B32B 13/04* (2013.01); *B32B 13/045* (2013.01); *B32B 13/06* (2013.01); *B32B 13/14* (2013.01); *B32B 15/02* (2013.01); *B32B 15/04* (2013.01); *C04B 20/1033* (2013.01); *C04B 20/1051* (2013.01); *C04B 20/1081* (2013.01); *C04B 28/36* (2013.01); *B32B 2250/02* (2013.01); *B32B 2250/03* (2013.01); *B32B 2250/40* (2013.01); *B32B 2262/10* (2013.01); *B32B 2262/101* (2013.01); *B32B 2262/103* (2013.01);
(Continued)

(58) Field of Classification Search
CPC .. C04B 7/00; C04B 7/34; C04B 28/00; C04B 32/00; C04B 9/00; C04B 12/00; C04B 28/32; C04B 20/1033; C04B 20/1051; C04B 28/36; Y02W 30/91
USPC ......................................... 106/638, 683, 685
See application file for complete search history.

(56) References Cited

U.S. PATENT DOCUMENTS 3,951,885 A   4/1976  Thompson
4,158,570 A   6/1979  Irwin
(Continued)

FOREIGN PATENT DOCUMENTS

WO    2015191071 A1   12/2015

OTHER PUBLICATIONS

Canadian Patent Office Action for Application No. 3,020,158 dated Apr. 7, 2022 (3 pages).
(Continued)

*Primary Examiner* — James E McDonough
(74) *Attorney, Agent, or Firm* — Christopher G. Hayden

(57) ABSTRACT

This application relates to making magnesium oxychloride boards. A magnesium oxychloride slurry is mixed by directing magnesium chloride, magnesium oxide, at least one phosphate, at least one inorganic salt, and water into a mixer and mixing these ingredients together to form a slurry. At least one filler is then mixed with the slurry. The slurry is directed to a mold. The mold is formed with the slurry to form a magnesium oxychloride board. The magnesium oxychloride board is then cured.

24 Claims, 5 Drawing Sheets

Comparison of fire testing results of 5/8" Type X drywall, 12 mm commercial MOC board, and 12 mm board according examples of this application.

(51) Int. Cl.
  *B32B 5/02* (2006.01)
  *B32B 5/18* (2006.01)
  *B32B 13/02* (2006.01)
  *B32B 13/04* (2006.01)
  *B32B 13/06* (2006.01)
  *B32B 13/14* (2006.01)
  *B32B 15/02* (2006.01)
  *B32B 15/04* (2006.01)
  *C04B 20/10* (2006.01)
  *C04B 28/32* (2006.01)
  *C04B 28/36* (2006.01)

(52) U.S. Cl.
  CPC ... *B32B 2262/106* (2013.01); *B32B 2262/108* (2013.01); *B32B 2262/14* (2013.01); *B32B 2264/101* (2013.01); *B32B 2264/12* (2013.01); *B32B 2266/0228* (2013.01); *B32B 2307/3065* (2013.01); *B32B 2307/714* (2013.01); *B32B 2307/7265* (2013.01); *B32B 2419/00* (2013.01); *B32B 2607/00* (2013.01); *Y02W 30/91* (2015.05)

(56) References Cited

U.S. PATENT DOCUMENTS

| | | | | |
|---|---|---|---|---|
| 8,038,790 | B1* | 10/2011 | Dubey | B28B 19/0092 106/711 |
| 8,187,423 | B1 | 5/2012 | Glenn et al. | |
| 2005/0103235 | A1 | 5/2005 | Harrison | |
| 2007/0130864 | A1 | 6/2007 | Semmens et al. | |
| 2008/0145550 | A1 | 6/2008 | Caine et al. | |
| 2011/0088597 | A1 | 4/2011 | Wu et al. | |
| 2011/0155977 | A1 | 6/2011 | Huddy et al. | |
| 2011/0219985 | A1 | 9/2011 | Gonzalez | |
| 2012/0156381 | A1 | 6/2012 | Allouche et al. | |
| 2013/0000520 | A1 | 1/2013 | Wu et al. | |
| 2013/0115835 | A1 | 5/2013 | Voit et al. | |
| 2013/0263759 | A1* | 10/2013 | Rademan | C04B 28/32 106/661 |

OTHER PUBLICATIONS

Canadian Patent Office action for Application No. 3,020,158 dated Nov. 9, 2021 (4 pages).

Deng Dehua, et al., A Study on the Water Resistance of Magnesium Oxychloride Cements Improved by the Soluble Phosphates, Journal of South China Construction University, vol. 7, No. 2, pp. 21-30 (Sep. 1999).

Karimi, Y., et al., Investigations on the mechanical and hydration properties of sorel cement by changing the concentration of magnesium chloride, Journal of Ceramic Processing Research, vol. 13, No. 6, pp. 725-729 (2012).

Zhang, Zuhua, et al., Geopolymer foam concrete: An emerging material for sustainable construction, Construction and Building Materials, vol. 56, pp. 113-127 (2014).

International Search Report and Written Opinion for Application No. PCT/US2017/025921 dated Jun. 29, 2017 (10 pages).

* cited by examiner

Figure 1. Comparison of fire testing results of 5/8" Type X drywall, 12 mm commercial MOC board, and 12 mm board according examples of this application.

Figure 2. Cross-section structure of a sandwich board with Geopolymer core

Figure 3. Cross-section structure of a sandwich board with MOC core

Figure 4. Cross-section structure of a SIP with geopolymer frame and EPS cores

FIRE RETARDANT CONSTRUCTION MATERIALS

BACKGROUND

Magnesium oxychloride (MOC) cement, also known as Sorel cement, has been used in many parts of the world. It is made by lightly burned magnesium oxide, magnesium chloride, water, and additives. It is commonly believed that the 5-1-8 phase, where the $MgO:MgCl_2 \cdot 6H_2O:H_2O$ molar ratio is 5:1:8, is the desirable phase which contributes the most strength. Research indicated that ideal ratios for the raw materials vary between 6:1:13 to 9:1:17 for optimum strength, dimensional stability, and water resistance.

MOC is a non-hydraulic cement that's light, strong, fire retardant, mold resistant, and easy to cut and fasten. Comparing to Ordinary Portland cement, MOC is less water resistant and potentially poses fastener corrosion problems due to the presence of high levels of chloride.

Magnesium oxysulfate (MOS) and magnesium phosphate cements are other members of the magnesia cement family. The oxysulfate and phosphate cements are not as widely used as MOC.

Unfortunately, there are many disadvantages to the current MOC boards used in the construction industry. Most of MOC cement is made in Asia in the form of boards reinforced with woven, non-woven, or chopped glass fiber. Typical sizes of the board are 4'×8' of various thickness, from 3 mm to 50 mm. These MOC boards, known simply as MgO boards on the market place, are used as wall boards, floors, tile backer boards, and other applications. Factors limiting the wide spread use of the MOC boards include high cost, relatively high density, and the perception of poor handling by the construction industry. MOC boards do not handle as the common gypsum drywall boards, Common MOC boards are cut using either carbide or diamond blades and create a lot of dust. For fastening, special counter-sink crews are used to prevent cracking. The boards according to this application can be cut and fastened like regular gypsum boards.

Almost all MOC boards produced today use wood particles as a main filler material. Indeed, almost all MOC boards made today contain 5-20% wood particles by weight. Wood particle fillers have the advantage of very low cost and they improve the flexibility of the finished board. These boards, however, come with many disadvantages. Wood fillers absorb large amounts of water and a formulator has to compromise the performance of the product. The presence of wood also significantly reduce the fire resistance of the MOC boards which they comprise. Being organic in nature, wood particles also support the growth of mold, fungi, and other organisms.

MOC is a sacrificial type fire retardant. When a cured MOC material is exposed to fire, the heat drives a series of reactions where the crystalline water is evaporated. These reactions are highly endothermic and produce a cooling effect. One of the MOC decomposition products is MgO, which is a refractory material that can reflect heat. As a result, MOC loses almost all of its mechanical strength when decomposed by fire. This is an inherent disadvantage for most materials based on magnesia cement.

Further, all current commercial MOC boards have densities >0.8 grams/cm$^3$. For a ½" thick 4'×8' board, the weight is more than 65 lbs. This is considered as too heavy by the construction industry, Prior art technologies have attempted to solve this weight problem through the use of expanded polystyrene (EPS) beads as fillers. EPS has the advantage of very low density, low cost, and low water absorption. However, EPS is a low melting organic material that significantly reduces the fire performance of the MOC material. EPS also significantly reduces the physical strength of MOC, Similar problems also arise when low density boards are made through the use of foamed MOC cement. These boards have reduced fire retardancy and low strength.

Other attempts to resolve these issues may be found in Chinese patent CN1098394A (1995), which disclosed MOC formulations and additives to overcome the drawbacks of MOC cement such as hygroscopicity, efflorescence, and dimensional instability. The minimum $MgCl_2$ concentration in the Chinese patent was 18 Baume, which is higher than what would be needed for industrial practicability. In addition, no surface treated fliers were used and low density was not mentioned. Similarly, US2014/0079942 disclosed coating compositions containing essentially magnesium oxide, potassium phosphate, and calcium phosphate. Phosphate, however, is very expensive and is believed to be not suitable for construction boards. Further, boards coated with magnesium phosphate cement coating are inferior to MOC based products in terms of fire performance. U.S. Pat. No. 7,255,907 and US20090065972 disclosed MOC board compositions and procedures. The claims in the '907 and '972 patents are similar to commercial boards on the market. Such boards, however, generally have a density of >0.9 grams/cm$^3$. U.S. Pat. No. 8,066,812 disclosed formulations with densities >1.0 grams/cm$^3$. When these materials are used as wall board, a ½" thick 4'×8' board weighs more than 70 lbs. This is too heavy to be reasonably used in the construction industry. In addition, the current materials disclosed in this art are difficult to paint or join with joining compounds.

There is, therefore, a need for low density, low cost, high performance MOC building materials. There is further a need for such MOC building materials to be water resistant, retain high strength after exposure to fire, and be able to reduce corrosion.

SUMMARY

This application relates to making magnesium oxychloride boards. In one embodiment, a magnesium oxychloride slurry is mixed by directing magnesium chloride, magnesium oxide, at least one phosphate, at least one inorganic salt, and water into a mixer and mixing these ingredients together to form a slurry. At least one filler is then mixed with the slurry. The slurry is directed to a mold. The mold is formed with the slurry to form a magnesium oxychloride board. The magnesium oxychloride board is then cured.

This application further relates to magnesium oxychloride formulations. In one embodiment, the formulation comprises magnesium oxide, magnesium chloride, water, at least one low density filler, at least one phosphoric acid or phosphate salts, and at least one inorganic salt.

Additionally, this application relates to a low density, strong, non-corrosive, and easy to use construction board. The board comprises magnesium oxide, magnesium chloride, water, at least one low density inorganic filler, at least one phosphoric acid or phosphate salts, and at least one inorganic salt.

DRAWINGS

DETAILED DESCRIPTION

Figure 1:
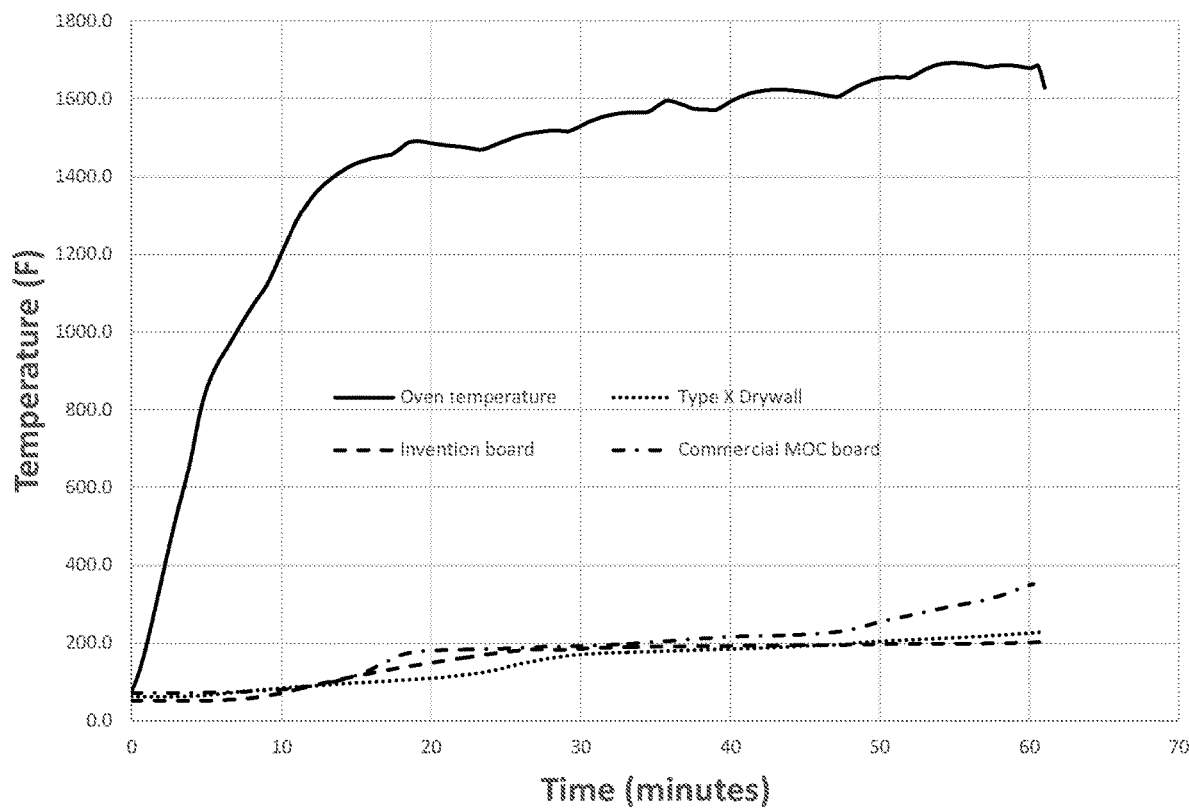
FIG. 1 depicts a graph comparing fire testing results for ⅝" Type X drywall, 12 mm commercial MOC board, and an exemplar 12 mm board from the methods and boards described herein.

The instant methods, formulations, and boards are directed to MOC materials that are light, strong, easy to use, and highly fire retardant.

MOC is a non-hydraulic cement that hardens easily under ambient conditions. The reaction is exothermic and the heat released is in most cases sufficient to ensure rapid curing of the cement. In some cases, however, the curing speed maybe too high for best crystal structure and strength. MOC is made from magnesium oxide and magnesium chloride. Lightly burned magnesium oxide (MgO), one of the key ingredients of MOC, is easily obtained by heating natural magnesium carbonate at <1000° C. The other main ingredient of MOC, magnesium chloride, is a byproduct of salt making. Therefore, MOC cement has a much lower carbon foot print than Portland cement.

In order to obtain MOC materials with low density and high fire retardancy, low density, high temperature resistant fillers were used with the methods and formulations discussed herein. In some embodiments, expanded perlite and vermiculite were utilized. While expanded perlite and vermiculite have low density and good compatibility with MOC, they have traditionally been seen as insufficient for use in MOC formulations and building materials due to the large amount of water that historically had to be utilized to ensure workability. The addition of large amounts of water dilutes the magnesium chloride. This dilution detrimentally affects the curing of the MOC, leading to a weak material, (This drawback was reported in the art at Karimi and Monshi, 2012, Journal of Ceramic Processing Research, 13(6), 725-729). In other words, when high levels of expanded perlite or vermiculite are used, the ideal molar ratio of 6:1:13 to 9:1:17 cannot be maintained. Further, known corrections to the curing problem create additional problems rendering the boards essentially unusable in the construction industry. For example, if additional $MgCl_2$ is used to counteract the $MgCl_2$ dilution and to ensure proper curing, the resulting formulation will see corrosion, "sweating" (excess $MgCl_2$ absorbing water from moist air to form droplets or liquid film on the board), poor water resistance, and related problems.

Applicant further adds phosphoric acid and/or phosphate salts to Applicant's formulation, Although phosphoric acid and phosphate salts have been used to improve the water resistance of MOC, use of phosphate compounds traditionally results in a slow curing MOC which, in turn, leads to a softer and weaker cement. Thus, conventional wisdom would indicate that the use of phosphates in a MOC formulation where the speed of cure is already slow due to the low concentration of MgCl2 is a poor choice. Nonetheless, Applicant discovered that the use of phosphate compounds in conjunction with the other elements of Applicant's formulation provided a harder and stronger MOC cement.

Applicant's formulation further includes iron ($Fe^{2+}$) and/or aluminum ($Al^{3+}$) salts. It is theorized that these salts form iron hydroxide or aluminum hydroxide which could seal the micro-pore structure of the MOC and improve water resistance. In some embodiments, ferrous sulfate was used in the formulations. In one exemplar formulation, an addition level of 4% ferrous sulfate, based on the amount of MgO, resulted in the ferrous sulfate additionally giving the formulation a pleasant light beige color.

In some embodiments, water absorption of expanded perlite and vermiculite may be further reduced by utilizing water repellent coating treated materials. In addition to decreasing water absorption, such materials may also rescue the amount of water that must be used in the formulation. Examples of possible coatings compatible with the formulations described herein include silicones, silanes, acrylic polymers, silicone modified acrylic polymers, or other water repellents.

One major problem that may arise when including such coatings is that the mechanical shear during mixing of MOC formulations is sufficient to damage the coated particles, exposing untreated surfaces and lead to high water absorption. It was discovered that this problem can be partially resolved by using small particle size fillers which are less susceptible to shear damage. Small particle size fillers, such as silicone treated perlite, however, are very difficult to mix with the hydrophilic MOC cement and the resulting product is weaker due to the large surface area of the small particle size perlite. Techniques were developed by Applicant to resolve the problems.

The first technique is to use low shear mixers, such as ribbon mixers, and using mixing sequences that reduce the shear of weak fillers. Conventionally, all ingredients are added to the mixer and mixed with adequate mixers. Alternatively, MgO, $MgCl_2$, and water are mixed into a thin slurry to which the fillers are added. These mixing procedures result in very viscous, and sometimes semi-dry phases where the shear force is sufficient to damage the perlite and vermiculite fillers and expose untreated surfaces.

It was further discovered that when MgO, $MgCl_2$, and water are mixed into a thin slurry and sprayed slowly to the dry expanded perlite or vermiculite in a ribbon blender, the fillers absorb less liquid and suffer little or no damage. While not wishing to be bound by theory, the inventor hypothesizes that the slurry contains precursors and crystals of the MOC cement. The precursors and crystals are big enough to plug the pores on the perlite and vermiculite surface, leading to reduced liquid absorption. This technique is more efficient when the slurry is made 30-120 minutes before being sprayed on the perlite and vermiculite.

To further reduce the density of the final product and reduce water usage, the MOC board can have a sandwich structure where the middle layer has a low slurry to filler ratio, and the top and bottom layers have a higher slurry to filler ratio. These sandwich boards have smooth and dense surfaces but lower density middle layer. The low density middle layer not only reduces the weight of the board, but also improves sound and thermal insulation due to the low density cell structure. The use of the sandwich structure has a further advantage in that regular perlite or vermiculite can be used without the water repellent coating, reducing cost and improving the bonding between the filler and the MOC.

Example 1

TABLE 1A

MOC slurry composition

| Ingredient | % weight |
| --- | --- |
| Lightly burned Magnesium oxide powder (≥93% MgO) | 31.2% |
| Attapulgite clay powder (200 mesh) | 0.1% |
| MgCl2•6H$_2$O (industrial grade) | 25.4% |
| Water | 41.7% |
| 85% phosphoric acid (industrial grade) | 0.3% |
| Ferrous sulfate (industrial grade) | 1.2% |

Seven hundred (700) grams of the slurry according to Table 1A was sprayed slowly while mixing gently onto 250 grams of a medium-fine grade expanded perlite (Pennsylvania Perlite Corp.) having a density of 5.5 lbs/cubic foot. This wet mix was labeled as M1A.

Seven hundred (700) grams of the slurry from Table 1A was sprayed onto 200 grams of a medium grade expanded perlite (PVP industries) with gentle mixing. This wet mix was labeled as M1B.

Paste of good workability was prepared according to Table 1B. Small lab board B1A was prepared by using 100 grams of paste according to Table 1B on the bottom layer, 400 grams of M1A for the middle layer, and 100 grams of paste according to Table 1B on the top layer. Similarly, lab board B1B was prepared by using 100 grams of paste according to Table 1B for the top and bottom layer respectively, and 400 grams of M1B for the middle layer.

Boards B1A and B1B have good curing properties, surface appearance, and strength. Depending on the compression pressure used for forming the boards, density varies from 0.5-0.65 grams/cm$^3$. This translates to 42-54 lbs for a 4'×8'×½" board.

TABLE 1B

Surface layer paste composition

| Ingredient | % weight |
| --- | --- |
| Lightly burned Magnesium oxide powder (≥93% MgO) | 39.3% |
| MgCl2•6H$_2$O (industrial grade) | 24.0% |
| water | 25.2% |
| Permalite Block Fill (Dicapearl) | 4.5% |
| Sil-Cell 32 (Silbrico Corp.) | 4.5% |
| 85% phosphoric acid (industrial grade) | 0.4% |
| Ferrous sulfate (industrial grade) | 1.6% |
| Supercizer 5 (Fritz-Pak) | 0.5% |

Example 2

Boards can be made using a single mixture whose composition is shown in Table 2A. The formulation gives a smooth paste that's easy to form a board. Mixing the low density Sil-Cell 32 coated perlite with the rest components, however, was too slow for practical applications. A wetting agent, such as Silsurf A008, was used to speed up the mixing. The most effective procedure is to mix MgCl$_2$ with 90% of the water, ferrous sulfate and phosphoric acid. Supercizer 5 (a water reducer) was dissolved in 5% of the water and then added to the MgCl$_2$ solution. Sil-Cell 32 was then added to the liquid mixture, Silsurf A008 dissolved in the remaining 5% of the water was added evenly on top of the Sil-Cell 32 perlite, followed by adding pre-mixed magnesium oxide, glass fiber and Attapulgite clay powder. The materials were mixed to form a smooth paste which was then made into a hand board B2.

TABLE 2A

Paste composition using coated fine perlite

| Ingredient | % weight |
| --- | --- |
| Lightly burned Magnesium oxide powder (≥93% MgO) | 25.4% |
| MgCl2•6H$_2$O (industrial grade) | 17.0% |
| water | 38.7% |
| Sil-Cell 32 (Silbrico Corp.) | 16.8% |
| Attapulgite clay powder (200 mesh) | 0.3% |
| Chopped fiberglass (0.5" length) | 0.2% |
| 85% phosphoric acid (industrial grade) | 0.2% |
| Ferrous sulfate (industrial grade) | 1.0% |
| Supercizer 5 (Fritz-Pak) | 0.5% |
| Silsurf A008 | 0.01% |

Example 3

Another formulation was tested according to the composition of Table 3A. Sil-Cell 32 was replaced with equal amount of Permalite Block Fill. Silsurf A008 was not required for this formulation.

TABLE 3A

Paste composition using coated medium-fine perlite

| Ingredient | % weight |
| --- | --- |
| Lightly burned Magnesium oxide powder (≥93% MgO) | 25.4% |
| MgCl2•6H$_2$O (industrial grade) | 17.0% |
| water | 38.7% |
| Permalite Block Fill (Dicapearl) | 16.8% |
| Attapulgite clay powder (200 mesh) | 0.3% |
| Chopped fiberglass (0.5" length) | 0.2% |
| 85% phosphoric acid (industrial grade) | 0.2% |
| Ferrous sulfate (industrial grade) | 1.0% |
| Supercizer 5 (Fritz-Pak) | 0.5% |

Hand board B3 according to the composition of Example 3 cured faster than board B2, and showed higher final strength than B2.

A pilot production trial using formulation according to Example 3 was carried out. A 0.4-0.6 mm thick non-woven fiber glass was used on the top and bottom of the boards during the production process. The test boards were evaluated by experienced construction professionals in terms of general handling, cutting, nailing, screwing, and related properties. The conclusions by the construction professionals were that the test boards according to Example 3 were superior to commercial gypsum boards in all aspects.

According to the published literature, fastener corrosion due to the high levels of chloride is a major concern for MOC products. Two comparative corrosion tests were carried out. In the first test, four 6"×6"×0.5" boards according to Example 3 were used. Each board was pre drilled for the installation of one 12 d common bright steel nail, one 12 d galvanized nail, and one each of two kinds of 1" commercial drywall screws. One of the drywall screws has a shiny black coating while the other has a dull brown-black finish. The boards containing the fasteners were soaked in a one gallon container filled with local tap water. In a separate one gallon container filled with local tap water, the same fasteners were placed in the water. After two weeks, common steel nails installed in the MOC boards had no visible corrosion. The immediate vicinity of the steel nail hole had slight greyish discoloration. Galvanized nails and the drywall screws with the black coating showed no change after the two week test. The drywall screw with the dull brown-black coating had very slight rust on the tips after two weeks. Fasteners in the water only container had severe corrosions except the galvanized nails which had no corrosion.

The fact that the water saturated MOC boards according to Example 3 were less corrosive to metal fasteners than tap water as surprising. It indicated that the mildly alkaline pH of the MOC board probably provided some corrosion resistance. It also indicated that leaching of chloride from the board was insignificant.

In the second corrosion test, the leaching water from the container with the four 6"×6"×0.5" boards was compared with fresh tap water. Steel nails had much reduced corrosion in the leaching water comparing to nails in fresh tap water. This test again confirms the low corrosivity of the MOC board. It also indirectly indicated low chloride leaching. Water with additional chloride would cause more corrosion.

Laboratory scale ASTM E-119 test was carried out with the boards from the pilot production trial. ASTM E-119 is a standard test method to determine the integrity and ability of construction assemblies, such as walls, floors, roofs, and columns, to prevent heat transmission and fire spread. A board according to the formulation of Example 3 outperformed Type X gypsum drywall and a high quality, high density commercial MOC boarding that has a density of 0.9 grams/cm$^3$.

Test walls of 4×4' in size were constructed according to UL 465/ASTM E-119 using steel studs. ⅝" Type X drywall was fastened on the side not exposed to the fire while the test panel was fastened to the side exposed to fire. The Type X drywall used was ⅝" in thickness, the commercial MOC board and the board of this invention was 12 mm in thickness. No insulation was used in the wall cavities.

Turning now to the Drawings, FIG. 1 shows the comparison of fire testing results for these boards. In particular, FIG. 1 depicts the fire testing results for ⅝" Type X drywall, 12 mm commercial MOC board, and the Example 3 boards. Performance of the testing board is directly correlated with the temperature on the outside of the Type X drywall that is away from the fire. As shown in the results depicted in FIG. 1, it is clear that the MOC board disclosed in Example 3 outperforms both a high quality commercial MOC board, as well as the ⅝" Type X drywall board which is a certified product for fire rated wall construction.

Example 4

TABLE 4A

Paste composition using mixture of coated fine perlite and coated medium-fine perlite

| Ingredient | % weight |
|---|---|
| Lightly burned Magnesium oxide powder (≥93% MgO) | 25.4% |
| MgCl2•6H$_2$O (industrial grade) | 17.0% |
| water | 38.7% |
| Sil-Cell 32 (Silbrico Corp.) | 8.4% |
| Permalite Block Fill (Dicapearl) | 8.4% |
| Attapulgite clay powder (200 mesh) | 0.3% |
| Chopped fiberglass (0.5" length) | 0.2% |
| 85% phosphoric acid (industrial grade) | 0.2% |
| Ferrous sulfate (industrial grade) | 1.0% |
| Supercizer 5 (Fritz-Pak) | 0.5% |

Board B4 was made according to the composition of Table 4A. Board B4 had a lower density than Board B3, but had similar hardness and strength. Another advantage of using the mixed perlite is that no wetting agent was required for adequate mixing time.

Example 5

Some embodiments, such as the embodiment in this example, use of fly ash to improve the water resistance of MOC, Fly ash can be advantageously used with the formulations disclosed throughout this application, to include the exemplar formulation shown in Table 5A. Boards made according to this formulation have a slight grey color.

TABLE 5A

Paste composition using mixture coated fine perlite and coated medium-fine perlite

| Ingredient | % weight |
|---|---|
| Lightly burned Magnesium oxide powder (≥93% MgO) | 23.1% |
| MgCl2•6H$_2$O (industrial grade) | 14.7% |
| water | 38.0% |
| Fly ash (Type F) | 8.3% |
| Sil-Cell 32 (Silbrico Corp.) | 7.5% |
| Permalite Block Fill (Dicapearl) | 7.5% |
| Attapulgite clay powder (200 mesh) | 0.3% |
| Chopped fiberglass (0.5" length) | 0.2% |
| 85% phosphoric acid (industrial grade) | 0.2% |
| Ferrous sulfate (industrial grade) | 0.9% |
| Supercizer 5 (Fritz-Pak) | 0.5% |

Spalling, which is the cracking or the local explosion of materials occurring when those materials are exposed to fire due to the high steam pressure build up, is a problem to many materials including MOC and geopolymers. Spalling is a significant problem when small particle size vermiculite is used in MOC unless the material is allowed to dry for extended period of time. It has been suggested that organic fibers, which can melt and decompose when exposed to fire, can create channels for releasing steam pressure. Applicants discovered that formulations using a large particle size (larger than 5 mesh) filler, or a mixture of large and small particle size fillers, such as the formulation of Example 5, can prevent spalling.

Materials according to Examples 1-5 are almost 100% inorganic substances that do not support mold growth, and are naturally resistant against insect and fungal attack. Unlike current commercial MOC materials which contain sawdust, these materials do not support combustion and do not contribute heat.

One drawback of these materials is the relatively poor performance at very high temperatures due to the physical performance of the fillers. Perlite has a melting point of 1260° C. and its operating temperature is considered to be around 800° C. Vermiculite has a maximum operating temperature of 1150° C., In order for the materials to operate at temperatures >1100° C., ceramic materials have traditionally had to be used. Ceramics, however, are too expensive for common construction materials.

Applicants resolved this problem by utilizing special coatings based on geopolymers on expanded perlite and vermiculite. Geopolymers are three dimensional inorganic polymers consisting networks of silica and alumina. Geopolymers are sometimes referred as alkali activated cement or hydraulic ceramics. Geopolymers can be synthesized from inexpensive materials such as fly ash, meta-kaolin, slag, or mixtures thereof. The so-called activators can be sodium hydroxide, sodium silicate, or mixtures thereof, Potassium hydroxide and potassium silicate can also be used.

One unique property of geopolymers, as compared with other cement materials such as Portland cement, is geopolymers' excellent fire resistance. Commercial use of geopolymers, however, is very limited due to cost, availability, and consistency of raw materials (such as fly ash), as well as the corrosive nature of the activating solutions. Geopolymers were successfully used in the formulations disclosed herein. The formulations may include geopolymers by themselves, or may include geopolymers forming hybrid material(s) with MOC.

In some embodiments, Geopolymers may be used to coat expanded perlite or vermiculite to form a water impermeable ceramic layer. This ceramic layer reduces the water absorption and increase the strength of the low density fillers when used in MOC formulations. More importantly, the ceramic layer increases the temperature resistance of the fillers. When geopolymer coated perlite or vermiculite is used in MOC formulations, leaching of heavy metals, which are known contaminants in most fly ash materials, can be reduced or eliminated due to the known encapsulation properties of magnesia cement.

Example 6

Perlite, coated with geopolymer according to Table 6A was successfully used in a MOC formulation according to Table 6B.

TABLE 6A

Coating of perlite with a geopolymer formulation

| Ingredient | % weight |
|---|---|
| Medium perlite (PVP Industries) | 25.5% |
| Fly ash Type F | 35.7% |
| Fly ash Type C | 15.3% |
| 14M NaOH | 7.7% |
| Sodium silicate (PQ Clear Type D) | 7.7% |
| Water | 8.2% |

Water, sodium hydroxide (NaOH), and sodium silicate were mixed and then sprayed with an airless sprayer to pre-mixed fly ash and expanded perlite according to Table 6A. The well mixed material was allowed to cure for at least one week before used to make the MOC formulation according to Table 6B. Typically geopolymers are heat cured for at least 12 hours before ambient cure for about 30 days, Most studies are carried out using Type F fly ash, Type C fly ash was considered as unsuitable for geopolymer use. It was discovered in this study that mixtures of Type F and Type C fly ash can be used for reasonably fast cure at ambient temperature.

TABLE 6B

MOC formulation using geopolymer coated perlite

| Ingredient | % weight |
|---|---|
| Lightly burned Magnesium oxide powder (≥93% MgO) | 25.35% |
| MgCl2•6H$_2$O (industrial grade) | 17.00% |
| water | 38.80% |
| Coated perlite according to Table 6A | 17.15% |
| 85% phosphoric acid (industrial grade) | 0.23% |

TABLE 6B-continued

MOC formulation using geopolymer coated perlite

| Ingredient | % weight |
|---|---|
| Ferrous sulfate (industrial grade) | 0.97% |
| Attapulgite | 0.31% |
| ADVA ® Cast 575 (water reducer by W R Grace) | 0.20% |

Geopolymers have many potential applications in the field of fire protection. One of the factors limiting its widespread use, especially as a construction board or as a coating, is its high density. A wall board made from regular geopolymer would be too heavy to handle. Its hardness, while a positive attribute, also makes it difficult to use. A geopolymer board would probably have to be cut with a diamond blade.

Foamed geopolymer (Zhang etc, Construction and Building Materials, 56, 113-127, 2014), either by chemical foaming or physical foaming, can be prepared to reduce the density. One chemical foaming method is to use aluminum metal powders. Metal powders are expensive and the hydrogen released during the reaction is a potential explosion hazard. Another chemical foaming method is to use hydrogen peroxide. At least one report suggested that foamed geopolymer using hydrogen peroxide had poor performance.

With the experience of using low density fillers in MOC formulations, Applicant studied the use of expanded perlite and vermiculite in geopolymers. It was found that even low levels of perlite or vermiculite can rapidly absorb the liquid in an otherwise fluid geopolymer formulation and cause rapid hardening of the geopolymer. While this property may be used advantageously for some applications, the rapid curing poses difficulties for use as a coating or for making construction boards. When additional water is added to improve handling, it leads to curing problems and weak products. Water repellent treated perlite, such as those treated with silicon or silanes, are known to have low water absorption. It was found, however, silicon treated perlite such as Permalite Block Fill (Dicapearl) and Sil-Cell 32 (Silbrico Corp) rapidly absorbs water when added to geopolymer formulations. This is probably due to the high pH of the activating solution.

Perlite and vermiculite coated with MOC can be used as low density, low water absorption fillers for geopolymers to create low density fire resistant materials. The MOC coating provides another benefit in that its refractory property decreases heat transmission and improves the overall performance in applications such as fire walls. Another advantage is reduction of heavy metal leaching from fly ash by the magnesia cement.

Spalling, which is explosion or cracking of cement materials when exposed to fire due to steam pressure, is a concern for Portland cement and geopolymers. The use of porous fillers such as perlite or vermiculite was found to be able to reduce spalling of MOC and geopolymers.

Example 7

A relatively low density geopolymer composition was prepared according to Table 7. The MOC coated perlite (M1A) was prepared according to Example 1.

TABLE 7

Geopolymer composition using MOC coated perlite as filler

| Ingredient | % weight |
|---|---|
| MOC coated medium-fine perlite | 17.24% |
| Fly ash Type F | 39.57% |
| Fly ash Type C | 16.96% |
| 14M NaOH | 12.12% |
| Sodium silicate (PQ Clear Type D) | 4.84% |
| Water | 9.04% |
| ADVA ® Cast 575 (water reducer by W R Grace) | 0.23% |

The composition in Table 7 hardens at ambient temperature in minutes and develops excellent strength in 7-10 days. The composition can be modified by replacing the Type C fly ash with Type F fly ash. The modified composition free of Type C fly ash (replacing Type C with Type F) was heat cured in a sealed container in an oven at 60-80° C. for 24 hours before curing at ambient temperature. The cured geopolymer also had excellent strength.

The use of Structural Insulated Panels (SIP) is getting popular both in commercial and residential construction. One drawback of current SIP is its poor fire performance. When OSB (Oriented Strand Board) is used as the structural component, fire proofing is difficult. One common current practice is to protect the OSB based SIP with gypsum drywall boards. This practice complicates the process and adds weight to the structure. A relatively new product has appeared on the market where MOC boards of various thickness are laminated to EPS (Expanded Polystyrene) foam into sandwich structures. The sandwich structure can also be made by casting MOC paste on both sides of EPS foam boards and cure in place. Another product uses high percentage of EPS beads, a few mm in diameter, in either conventional or foamed MOC formulations. Relatively low density MOC-EPS products can be produced with low flammability. A drawback of MOC based solutions is its lack of structural integrity after extended fire exposures. Most MOC products lose significant strength after 1 hour exposure to fire similar to the ASTM E-119 test conditions.

Another drawback of current SIP panels is the high heat transmission of the structural components. For example, a SIP based on EPS core and fiberglass reinforced epoxy resin composite have excellent strength and low weight. The thin layer of composite material, however, has little insulating property so that the EPS core melts quickly when exposed to fire. The otherwise strong SIP loses strength quickly when the EPS core starts to melt.

Inexpensive, easy to use, and fire resistant SIP designs are needed. Materials of this application can be used in SIP designs for improved performance, especially strength retention after extended fire exposures. Various sandwich, layered, or grid structures can be used.

Figure 2:
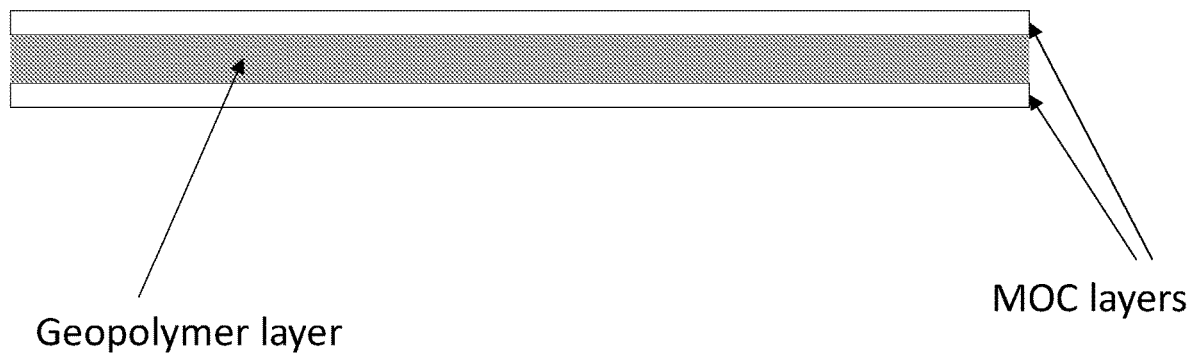
FIG. 2 depicts a cross-section of an exemplar sandwich board with a geopolymer core created from the methods described herein.

FIG. 2 is a representative 3 layer sandwich structure consisting a geopolymer core layer and MOC outer layers. This structure has the benefit of good appearance, low density, and improved strength retention comparing to conventional MOC based products. The use of the geopolymer core leads to cost savings due to the very low cost of fly ash. Boards similar to that shown in FIG. 2 can be used for interior wall construction, or for interior SIP manufacturing.

Figure 3:
FIG. 3 depicts a cross-section of an exemplar sandwich board with a MOC core created from the methods described herein.

FIG. 3 is a representative 3 layer sandwich structure consisting of a MOC core layer and geopolymer outer layers. This structure has excellent strength properties and weathering properties. This material can be used in exterior applications such as exterior wall panels, tunnel linings, and floor panels. The MOC core improves the fire resistance due to the large amount of heat absorbed during the decomposition of MOC, and due to the refractory nature of MOC and its decomposition products. Boards shown in FIG. 3 have an advantage of lower density due to the presence of the low density MOC core.

Figure 4:
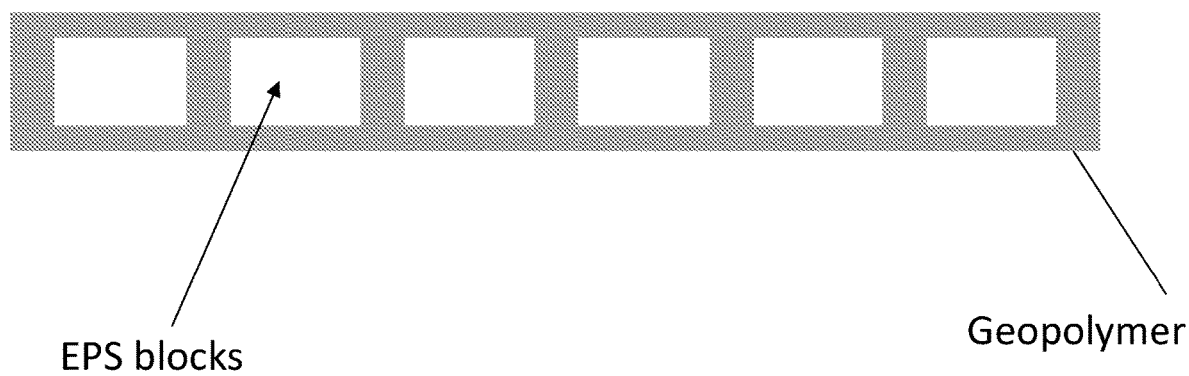
FIG. 4 depicts an exemplar cross section of a SIP with geopolymer frame and EPS cores, created from the methods described herein.

FIG. 4 is a representative illustration of a grid SIP design. The EPS provides insulation properties, reduces the weight while the geopolymer framework provides structural strength after extended fire exposures.

The materials illustrated in FIGS. 2-4 can be manufactured using any suitable equipment and processes known to those skilled in the art. Various formulations and compositions, including those represented in examples of this invention, may be used for designs in FIGS. 2-4.

Figure 5:
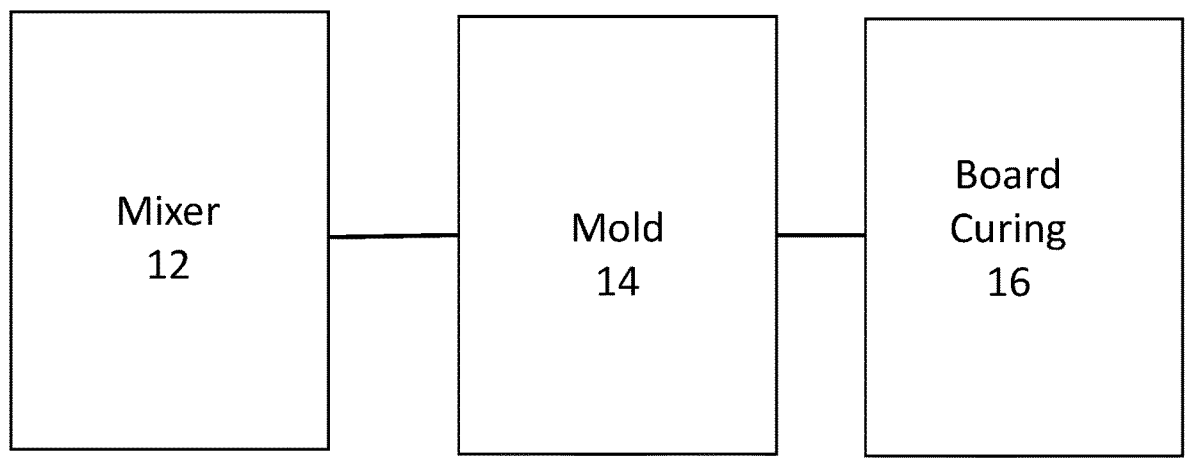
FIG. 5 depicts a flow chart of the steps of an exemplar method to produce the boards disclosed herein.

Turning now to FIG. 5, FIG. 5 depicts one method for making the MOC boards disclosed herein, An MOC board is made using the methods discussed herein. A magnesium oxychloride slurry is prepared via a mixer 12. The slurry may contain magnesium chloride, magnesium oxide, at least one phosphate compound, at least one inorganic salt, and water. The molar ratio of magnesium oxide:magnesium chloride:water may be between 4:1:13 to 9:1:40 in at least some embodiments.

In some embodiments, the inorganic salt is a ferrous, ferric, or aluminum salt. In one exemplar embodiment, the salt is ferrous sulfate. In that embodiment, the mass ratio of ferrous sulfate to magnesium oxide is between 2-16%.

Preferably, a low-shear mixer may be used to mix the slurry. The mixer may be a ribbon mixer or a paddle mixer, and may be operated in a batch or a continuous manner.

At least one inorganic filler is added to the slurry. In some embodiments, the ratio of filler to magnesium oxide is between 1:4 and 4:1. In some embodiments, the filler comprises 1-40% of the board by mass, or, more preferably 10-25% of the board by mass.

In preferred embodiments the filler is perlite, vermiculite, expanded clay, cenospheres, hollow glass spheres, or combinations thereof. In some embodiments, the filler may be precoated with a water repellent. For example, silicones, silanes, acrylics, silicone modified acrylics, waxes, and combinations thereof may be utilized. When the filler is expanded perlite or vermiculite, the filler may further be precoated with geopolymers or with magnesium oxychloride to aid in water resistance.

Some embodiments further include organic acids, fly ash, colorants, water repellents, water reducers, rheology modifiers, corrosion inhibitors, or combinations thereof. Similarly, some embodiments may further include chopped fibers, such as glass fibers, carbon fibers, organic fibers, high temperature rock fibers, basalt fibers, stainless steel fibers, or combinations thereof.

In some embodiments, this mixture is mixed for five hours or less. The mixture may be mixed, in some embodiments, at temperatures between 50° F. and 85° F. Mixing the slurry with the filler may sometimes include spraying the filler with the slurry. In such embodiments, the slurry may sometimes be aged prior to spraying. For example, the slurry may be aged between 30 minutes and 120 minutes prior to spraying.

The mixture is directed to a mold 14. After being placed in the mold, the board is cured 16.

Although the present methods, formulations, and boards have been shown and described in considerable detail with respect to only a few/particular exemplary embodiments thereof, it should be understood by those skilled in the art that it is not intended to limit the methods, formulations, or boards to the embodiments since various modifications, omissions, and additions may be made to the disclosed embodiments without materially departing from the novel teachings and advantages described herein, particularly in light of the foregoing teachings.

The invention claimed is:

1. A MOC formulation comprising:
   a slurry comprising magnesium oxide; magnesium chloride; water; and
   a low density filler selected from perlite, vermiculite, cenospheres, hollow glass spheres, or combinations thereof, said low density filler coated with at least one water repelling layer coating selected from at least partially cured magnesium oxychloride slurry that had been prepared 30-120 minutes before coating the low density filler, an at least partially cured geopolymer, or combinations thereof.

2. The MOC formulation of claim 1, further comprising an inorganic salt is a ferrous, ferric, or aluminum salt or combinations thereof, and wherein the ferrous, ferric, or aluminum salt is between 1% to 5% based on the weight of the MgO.

3. The MOC formulation of claim 2, further comprising a phosphoric acid or phosphorus salt at 0.5-2% as phosphoric acid based on the weight of MgO.

4. A low density, strong, corrosion resistant, easy to use MOC board made from the cured formulation of claim 1.

5. The board of claim 4, further including at least one metallic mesh or perforated thin metal sheet.

6. The board of claim 4, wherein the low density filler of claim 1 is expanded perlite, vermiculite, or combinations thereof.

7. The MOC formulation of claim 1, wherein at least one low density filler further comprises a water repellent selected from silicones, silanes, acrylics, silicone modified acrylics, waxes, and combinations thereof coated on the surface thereof.

8. The MOC formulation of claim 1, wherein the inorganic fillers are pre-coated with geopolymer, MOC, or combination thereof, said coating having been allowed to at least partially cure before adding the filler to the slurry.

9. The construction board of claim 4, further comprising at least two layers, wherein the first layer and the second layer comprise different ratios of magnesium oxide cement: filler.

10. The MOC formulation of claim 1, further comprising chopped fibers, wherein the chopped fibers include glass fibers, carbon fibers, organic fibers, high temperature rock fibers, alkali resistant fibers, basalt fibers, stainless steel fibers, or combinations thereof.

11. The board of claim 4, comprising geopolymers and containing low density fillers pre-coated with partially cured MOC.

12. The construction board of claim 4, wherein the construction board includes at least one geopolymer layer.

13. A Structural Insulated Panel comprising the cured formulation of claim 1, wherein the panel further comprises a geopolymer framework.

14. The panel of claim 13, further comprising geopolymers containing fillers pre-coated with MOC.

15. A magnesia cement formulation slurry comprising:
   a) the precursors of magnesium oxychloride cement, magnesium oxysulfate cement, magnesium phosphate cement, or mixtures thereof; and
   b) a filler selected from perlite, vermiculite, cenospheres, hollow glass spheres, or combinations thereof, at least one of said filler being previously encapsulated with a coating comprising i) a cured or at least partially cured magnesia cement, ii) a cured or at least partially cured geopolymer, iii) a layer of water repellant material, or combinations thereof.

16. The magnesia cement formulation of claim 15 comprising a water repellent selected from silicones, silanes, acrylics, silicone modified acrylics, waxes, and combinations thereof.

17. The magnesia cement formulation of claim 16 wherein filler is selected from expanded or unexpanded perlite, vermiculite, or combinations thereof, and the water repellent is pretreated on the filler before adding the filler to the slurry.

18. The magnesia cement formulation of claim 15 wherein the slurry comprises the precursors of magnesium oxysulfate cement.

19. A low density board made utilizing the cured formulation of claim 18.

20. The magnesia cement formulation of claim 15 wherein the at least partially cured magnesia cement comprises magnesium oxysulfate and the filler coating comprises a geopolymer.

21. A low density board made utilizing the cured formulation of claim 20.

22. A magnesia cement formulation slurry comprising:
   a) the precursors of magnesium oxychloride cement, magnesium oxysulfate cement, magnesium phosphate cement, or mixtures thereof, and
   b) a low density filler selected from perlite, expanded perlite, vermiculite, expanded vermiculite, cenospheres, hollow glass spheres, or combinations thereof, said low density filler comprising 10 to 25% by weight of the cured formulation by weight, and said low density filler being previously coated with a water repellant comprising a silicone, silane, acrylic, silicone modified acrylic, waxes, and combinations thereof in an amount sufficient to have low water absorption.

23. The magnesia cement formulation of claim 22 wherein the slurry comprises the expanded perlite, vermiculite, or mixture thereof, and wherein the filler further comprises a coating of a magnesia cement or a geopolymer.

24. A low density board made utilizing the cured formulation of claim 20.

* * * * *